US008724459B2

(12) United States Patent
Chen et al.

(10) Patent No.: US 8,724,459 B2
(45) Date of Patent: May 13, 2014

(54) METHOD FOR ESTABLISHING ADAPTIVE MOBILE CLUSTER NETWORK

(75) Inventors: Jie-Min Chen, Taipei (TW); Kai-Wen Tien, Tainan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 446 days.

(21) Appl. No.: 13/277,931

(22) Filed: Oct. 20, 2011

(65) Prior Publication Data

US 2012/0063322 A1 Mar. 15, 2012

Related U.S. Application Data

(62) Division of application No. 12/358,550, filed on Jan. 23, 2009, now Pat. No. 8,107,367.

(30) Foreign Application Priority Data

Jun. 18, 2008 (TW) .............................. 97122700 A (51) Int. Cl.
*H04L 12/26* (2006.01)

(52) U.S. Cl.
USPC ........................................................ 370/230

(58) Field of Classification Search
CPC ..... H04W 8/005; H04W 40/28; H04W 74/00; H04W 88/04; H04W 76/023; H04L 45/46
USPC ......... 370/254, 255, 257, 328, 329, 331, 342, 370/343, 229, 230, 230.1, 231; 455/446, 455/447, 448, 454, 456.1, 458
See application file for complete search history.

(56) References Cited

U.S. PATENT DOCUMENTS

| 5,497,504 | A | 3/1996 | Acampora et al. |
| 6,564,261 | B1 | 5/2003 | Gudjonsson et al. |
| 6,879,574 | B2 | 4/2005 | Naghian et al. |
| 7,428,229 | B2 * | 9/2008 | Bonta et al. ................... 370/338 |
| 7,577,091 | B2 * | 8/2009 | Antal et al. .................... 370/229 |
| 7,717,342 | B2 * | 5/2010 | Wang ...................... 235/472.01 |
| 7,990,860 | B2 * | 8/2011 | Smith et al. ................ 370/230.1 |
| 2008/0090575 | A1 | 4/2008 | Barak et al. |
| 2008/0298275 | A1 * | 12/2008 | De Sousa ...................... 370/255 |

* cited by examiner

*Primary Examiner* — Raj Jain
(74) *Attorney, Agent, or Firm* — Morris Manning & Martin LLP; Tim Tingkang Xia, Esq.

(57) ABSTRACT

The invention discloses a method of establishing an adaptive mobile cluster network. The method comprises the steps of: (a) determining a network service requested by a mobile communication device; (b) according to the requested network service, determining at least one communication parameter needed by the mobile communication device; (c) according to the needed communication parameter, selecting a header device from a plurality of wireless communication devices by the communication device; (d) selecting a plurality of agent devices from the remaining wireless communication devices by the header device; and (e) selecting a plurality of normal devices from the remaining wireless communication devices by the agent devices, so as to establish the adaptive mobile cluster network.

9 Claims, 7 Drawing Sheets

METHOD FOR ESTABLISHING ADAPTIVE MOBILE CLUSTER NETWORK

CROSS-REFERENCE TO RELATED APPLICATIONS

This application is a Divisional patent application of, and claims benefit of U.S. patent application Ser. No. 12/358,550, filed Jan. 23, 2009, entitled, "METHOD FOR ESTABLISHING ADAPTIVE MOBILE CLUSTER NETWORK", (hereinafter the "parent application",) filed in the name of Jie Min Chen et al., which status is allowed. The parent application itself claims the benefit, pursuant to 35 U.S.C. 119(a) of Taiwanese Patent Application No. 097122700, filed Jun. 18, 2008. Each of the above applications is incorporated by reference herein in its entirety.

BACKGROUND OF THE INVENTION

1. Field of the Invention

The invention relates generally to a method for establishing an adaptive mobile cluster network to increase the efficiency of data transmission.

2. Description of the Prior Art

The art of global system for mobile communications is to set several fixed base stations to form a cell around the base station. Every mobile device in the cell can communicate with other device through the base station.

In the conventional "Mobile mesh ad-hoc networking", as U.S. Pat. No. 6,879,574 disclosure, if a mobile node makes an connection request, non-trunk node have to link trunk node and then backbone domain through access domain to form mobile mesh ad-hoc networking. Besides the fixed infrastructures are necessary for the mobile mesh ad-hoc networking, in which the only the mobile nodes are moveable. There are some shortcomings: it is rather inefficient for data transmission and lack of flexibility due to the fixed infrastructure.

An aspect of the present invention is to provide a method for establishing adaptive mobile cluster network to solve the problems above.

SUMMARY OF THE INVENTION

Accordingly, an aspect of the present invention is to provide a method for establishing an adaptive mobile cluster network. The method applies a mobile communication device itself to detect nodes based on network service, and establishes a new mobile cluster network according to adaptive cells.

According to an embodiment of the invention, the method comprises the following steps:
(a) determining a network service requested by a mobile communication device; (b) according to the requested network service, determining at least one communication parameter needed by the mobile communication device; (c) according to the needed communication parameter, selecting a header device from a plurality of wireless communication devices by the communication device; (d) selecting a plurality of agent devices from the remaining wireless communication devices by the header device; and (e) selecting a plurality of normal devices from the remaining wireless communication devices by the agent devices, so as to establish the adaptive mobile cluster network.

Another aspect of the present invention is to provide a method for establishing an adaptive mobile cluster network. The method sets a reference model through a server according to positioning data and initial data, and then the mobile communication device rapidly establishes a new mobile cluster network according to the reference model.

According to another embodiment of the present invention, the method comprises the following steps: (a) a mobile communication device delivering a predefined position, a service request and authorization information to a server which stores the information of a plurality of wireless communication devices; (b) the server defining an evaluating range of a reference model; (c) the server determining if the service request is matched with the authorization information; (d) if the result of step (c) is yes, the server selecting at least one of the wireless communication devices to be a recommended header device, according to the information of the wireless communication devices and at least one communication parameter needed by the mobile communication device for the service request; (e) the server establishing the reference model, according to the predefined position, the service request and the evaluating range; (f) the server delivering the reference model and the information of the recommended header devices to the mobile communication device; (g) the mobile communication device determining a header device according to the reference model and the recommended header devices; and (h) the header device establishing an adaptive mobile cluster network.

Compared with the prior art, the present invention has the following advantages: (1) efficient network structure for transmitting data; (2) flexible for service requests; (3) better managing in a movable network; (4) more adaptive cells; and (5) better network loading.

The objective of the present invention will no doubt become obvious to those of ordinary skills in the art after reading the following detailed description of the preferred embodiment, which is illustrated in various figures and drawings.

DETAILED DESCRIPTION OF THE INVENTION

An Organization of Mobile Cluster Network

Mobile cluster network is established based on the movement of mobile communication devices. The method of the invention for establishing a mobile cluster network is for the purpose of service requests. A mobile communication device moves would determine whether to form a new mobile cluster network during movement, while it would maintain and use the current mobile cluster network during stationary. Thus, the mobile cluster network is different from telecommunication wireless network of base stations, wireless local network with nodes and other wireless networks with infrastructures.

Figure 1:
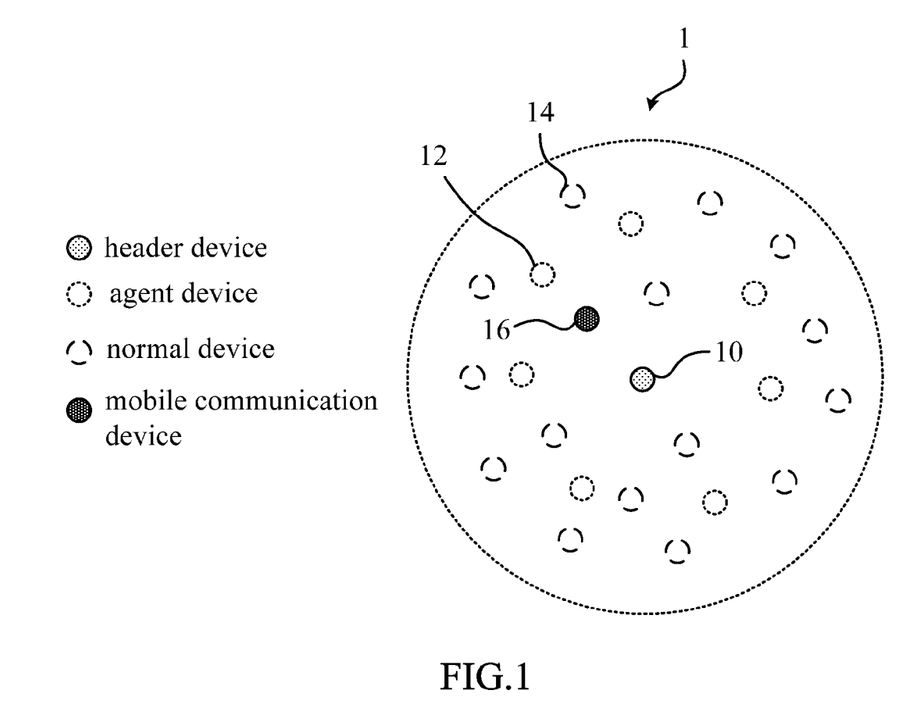
FIG. 1 illustrates a mobile cluster network of the invention.

The invention provides two methods to establish mobile cluster network for better network communication and data transmitting: one is done according to a requested network service (or "service request"), monitors the network nodes and establishes a mobile cluster network with adaptive cells; the other one is to establish a reference model through a server according to positional and primitive data. The mobile communication device rapidly establishes a mobile cluster network according to the reference model. Please refer to FIG. 1. FIG. 1 illustrates a mobile cluster network 1 and the outer circular dotted line represents cell. The mobile cluster network 1 comprises a header device 10, a plurality agent devices 12 and normal device 14 in order to assist a mobile communication device 16 of the mobile cluster network 1 in providing better network communication and data transmitting. The header device 10 which plays the role of a coordinator in the mobile cluster network 1 is detected by the mobile communication device 16 and receives commands therefrom. The header device 10 follows the commands to search the agent device 12 in its communication range and establish adaptive cells of the mobile cluster network 1. The agent device 12 of the mobile cluster network 1 is used to manage a plurality of normal devices 14 nearby. It has to be noted that the header device 10 can also directly manage the normal devices 14 instead of the agent device 12. The normal device 14 is basic member of mobile cluster network 1 for assisting in transmitting data. The header device 10, the agent device 12, and the normal device 14 could be a mobile or fixed device (for example, mobile communication device, base station, wireless access points) and all of them have wireless communication modules or ability.

The Adaptive Cell Systems of Mobile Cluster Network

The outer circular cell of FIG. 1 is determined by the header device 10, the agent device 12, and the normal devices 14 considering the communication parameters, (such as signal intensity, antenna pattern, computing ability, network type and network status) and being circular due to the communication quality of the surroundings is similar. In fact, the shape of the cell could be changed according to network service and communication quality.

Figure 2A:
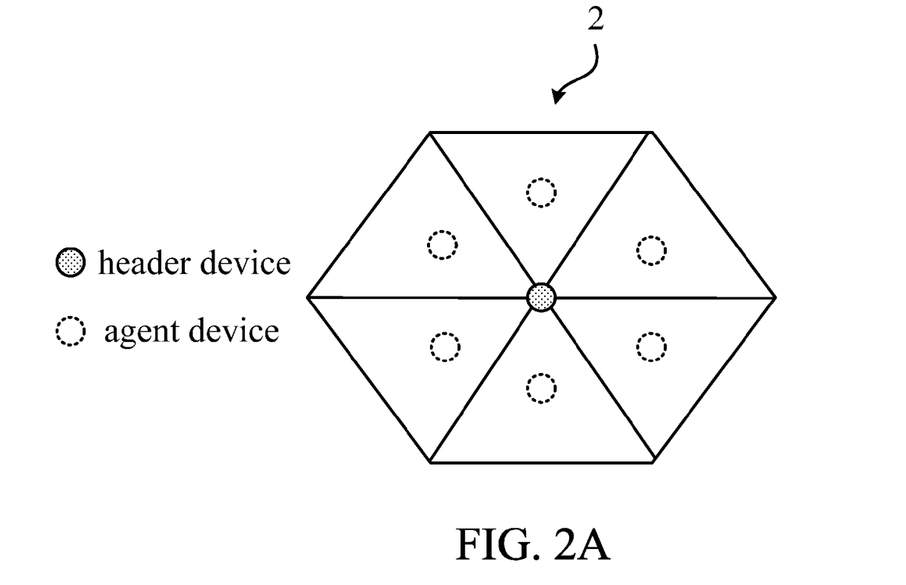
FIG. 2A illustrates the cell system of the mobile cluster network.
Figure 2B:
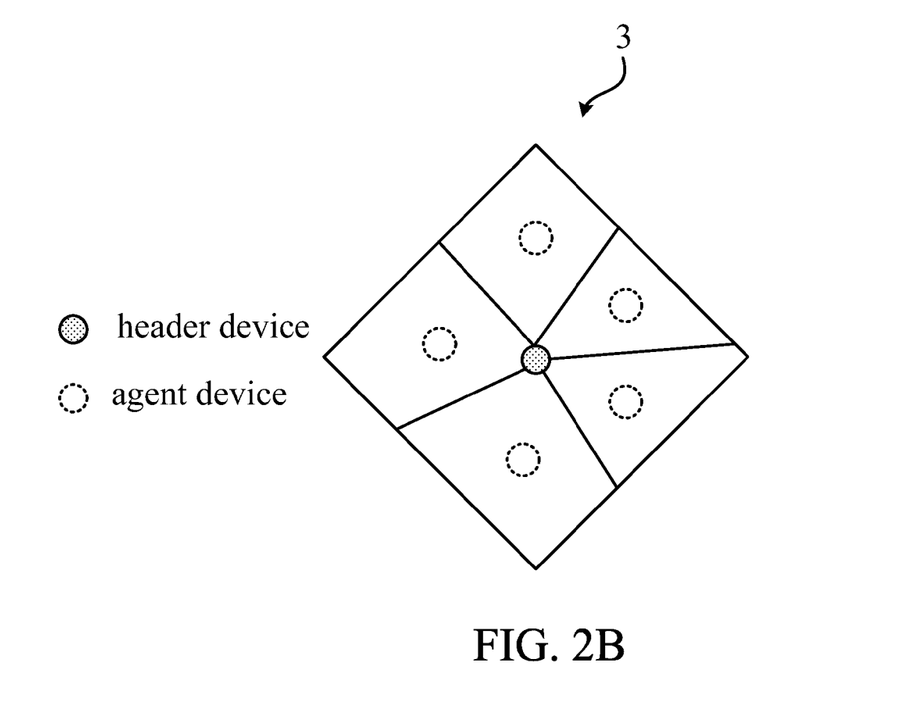
FIG. 2B illustrates the cell system of the mobile cluster network.

Please refer to FIG. 2A and FIG. 2B. FIG. 2A illustrates a cell system 2 of a mobile cluster network. FIG. 2B illustrates another cell system 3 of a mobile cluster network. The nodes of the cell system 2 distribute uniformly and therefore the agent devices of the cell system 2 manage the cell system 2 uniformly. Please refer to FIG. 2B. The nodes of the cell system 3 distribute non-uniformly and therefore the agent devices of the cell system 3 manage the cell system 3 non-uniformly.

Figure 3:
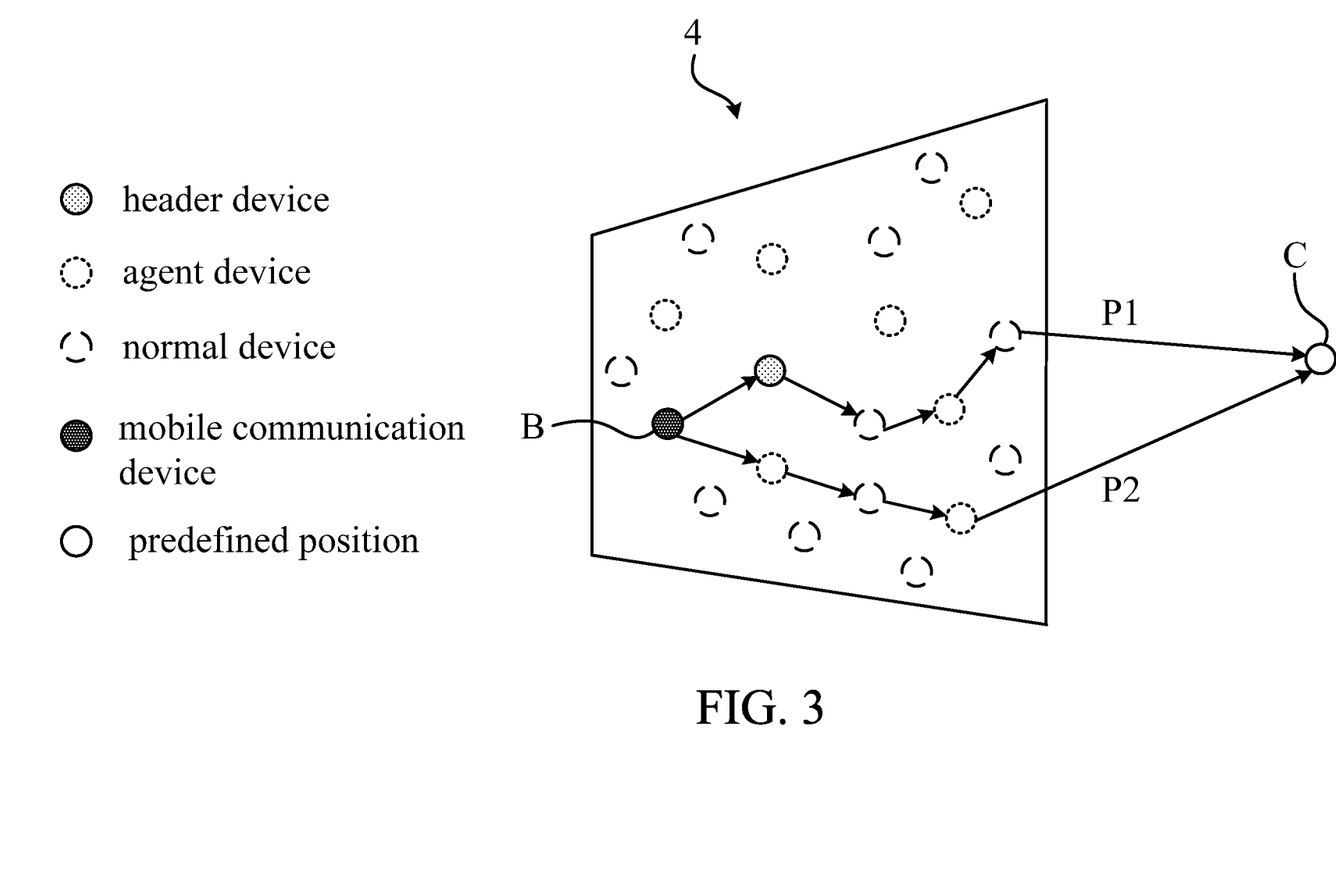
FIG. 3 illustrates the mobile communication device uses the cell systems of mobile cluster network to communicate with remote device.

Please refer to FIG. 3. FIG. 3 illustrates a mobile communication device B which uses a cell system of mobile cluster network 4 to communicate with a remote device C. As illustrated in FIG. 3, if the mobile communication device B has highest priority, both network communication and communication quality of data transmitting of the mobile communication device B would be taken into consideration first to form a mobile cluster network (i.e. the mobile cluster network 4). As illustrated in FIG. 3, there are two paths, P1 and P2, determined after considering the communication parameters, from the mobile communication device B to the remote device C. Path P1 includes a header device, an agent device and two normal devices; whereas path P2 includes two agent devices and one normal device. Either path P1 or path P2 would be selected according to transmitting test packets.

The First Embodiment of the Present Invention

Figure 4:
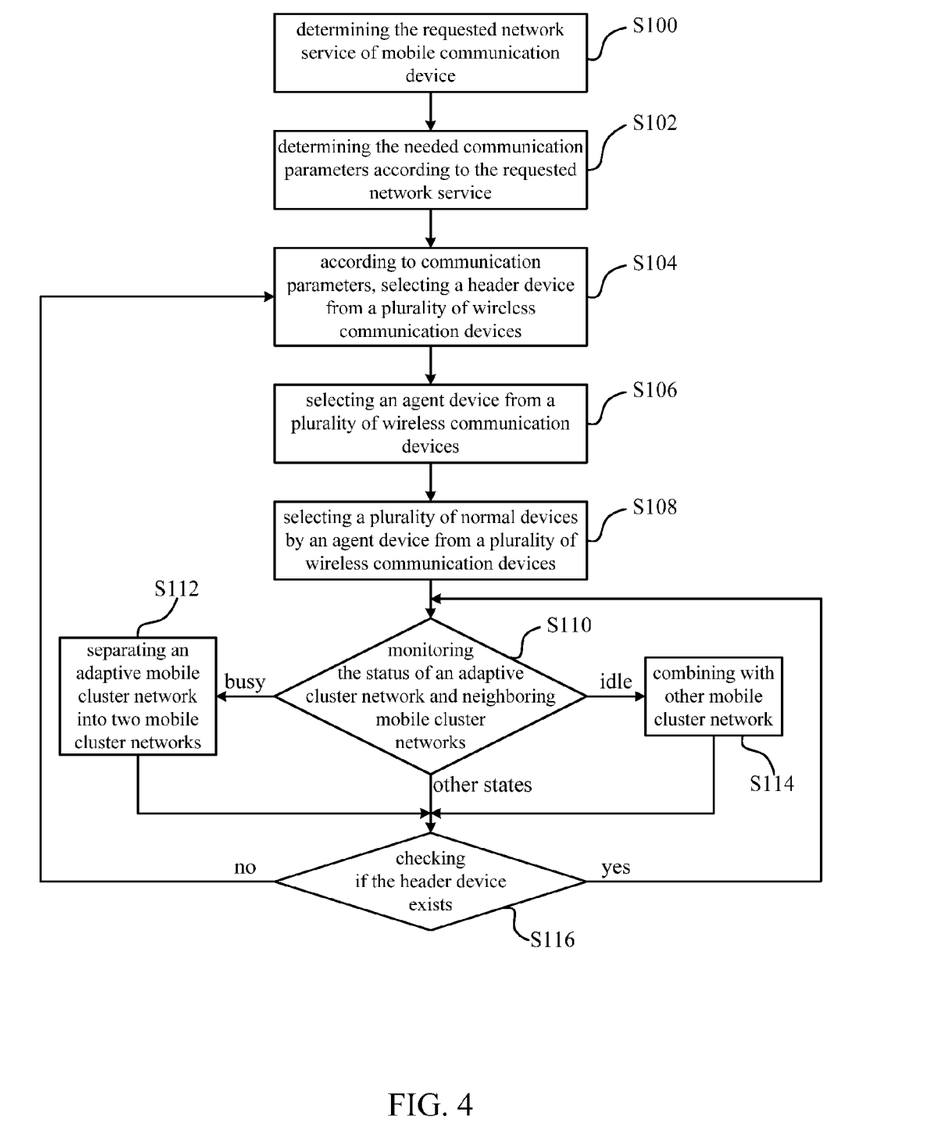
FIG. 4 illustrates a flow chart of the method for establishing the adaptive mobile cluster network according to an embodiment of the invention.
Figure 5:
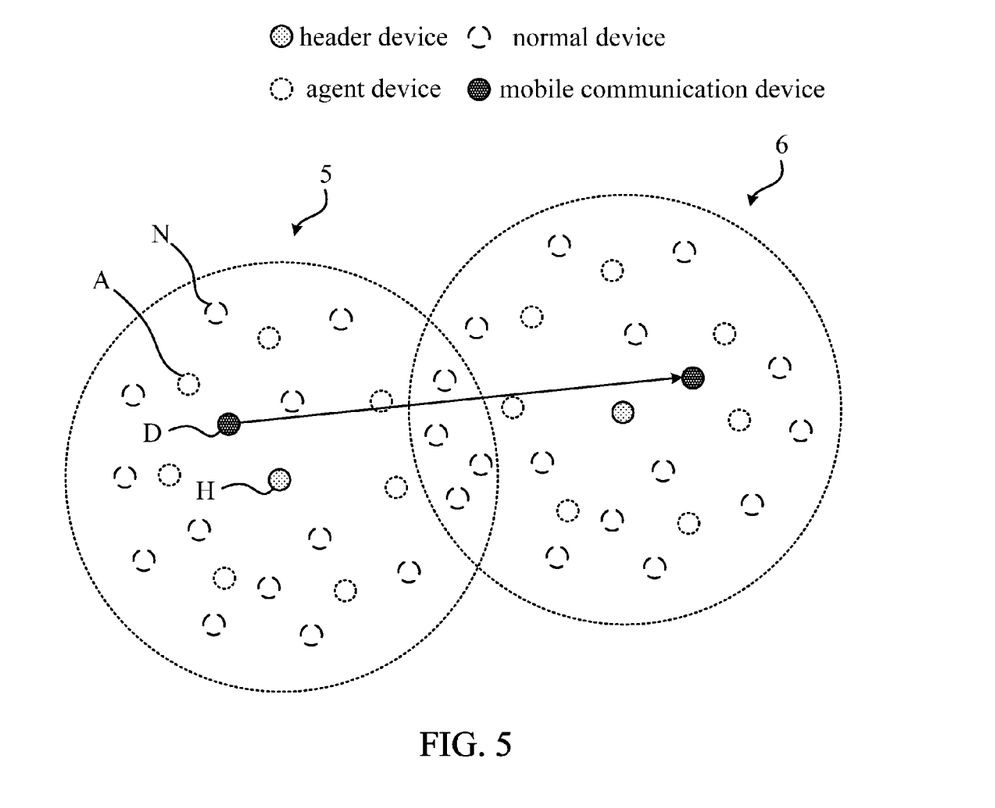
FIG. 5 illustrates a mobile cluster network established with the movement of the mobile communication device.

Please refer to FIG. 4 and FIG. 5. FIG. 4 illustrates the flow chart of how, according to the first embodiment of the invention, to establish an adaptive mobile cluster network. FIG. 5 illustrates how to establish a mobile cluster network based on movement of mobile communication device. The method of the invention for establishing an adaptive mobile cluster network comprises the following steps.

At first, step S100 is executed and the property of a requested network service of mobile communication device D is determined. There are two mechanics for the requested network service: (1) personal service; (2) cluster fair service, and which mechanics is selected based on the property of a requested network service. The property of a requested network service includes network using priority and packet transmitting priority. If the network using priority is high and the packet transmitting priority is low, either (1) or (2) can be selected. If the network using priority is low and the packet transmitting priority is high, only (1) can be selected. If the network using priority is low and the packet transmitting priority is low, then (2) is selected. If the network using priority low and the packet transmitting priority is high, then (2) is selected. Each mechanics can be assigned to a corresponding level.

Step S102 is then executed. According to the requested network service, the needed communication parameters of the mobile communication device D are determined. The communication parameters include signal intensity, antenna pattern, computing ability, network type and network status. With higher level requested, more communication parameters have to be taken into consideration.

Step S104 is then executed. According to the communication parameters, the mobile communication device D selects a wireless communication device as a header device H from a plurality of wireless communication devices. In a practical application, the header device H has the best communication quality of all the wireless communication devices in the link range of mobile communication device D.

Step S106 is then executed. The header device H selects a plurality of agent devices A from the remaining wireless communication devices. In a practical application, the number of agent devices A is limited to a pre-set percentage of all wireless communication devices, and each agent device A has better communication quality than other wireless communication devices except the header device H.

Step S108 is then executed. Each of the agent devices A selects a plurality of normal devices N from the remaining wireless communication devices to establish an adaptive mobile cluster network 5. In a practical application, The way of establishment comprises two steps: (A) Each of the agent devices A in the link range of the header device H selects the number of normal devices N for communication and management; (B) if the result of step S100 is (1) (personal service), then (a) acquire a best path through packet transmission testing; (b) delete the normal device N which is far from the best path for reducing loading according to the time spent on positioning and packet transmission testing. If the result of step S100 is (2) (cluster fair service), retain the number of normal devices N, which is determined by the agent devices A in step (A) (i.e. without deleting any normal device N).

Step S110 is then executed to monitor the status of the adaptive mobile cluster network 5 and other neighboring mobile cluster network. The monitor is executed by the agent devices A of the mobile cluster network 5 through monitoring the status of packet delivering and receiving of normal devices N. The status, for example, includes fail rate, time spend and data variation during packet delivering and receiving, which would be sent to the header devices H periodically by the agent devices A. The communication between neighboring mobile cluster networks is executed through the respective normal device, thus, the mobile cluster network 5 can obtain the status and existence of neighboring mobile cluster network.

If the monitoring result of step S110 is busy, then step S112 is executed. The adaptive mobile cluster network 5 is separated into two mobile cluster networks. The separation is based on the network status and the communication parameters needed to determine the members of the two mobile cluster networks.

If the monitoring result of step S110 is idle, and other mobile cluster networks exist in the neighboring, step S114 is then executed. The header device H, according to communication parameters and the network statuses of other mobile cluster networks, determines that the adaptive mobile cluster network 5 would be combined with which mobile cluster network.

Then step S116 is executed to check if the header device exists. There are three situations while checking the header device: (1) if the mobile cluster network is separated into two mobile cluster networks due to the busy network status, one of new mobile cluster networks with the original header device returns to step S110 and monitor the network status continuously; the other mobile cluster network without the original header device returns to step S104 to select a new header device and agent devices according to step S106; (2) if the monitoring result of the network status is normal and the header device still exists, returns to step S110 and monitors the network status continuously; if the header device does not exist (the situation occurs when the header device moves out of the mobile cluster network), returns to step S104 to select a new header device and agent devices according to step S106; (3) there would be two header devices if the mobile cluster network is combined with other mobile cluster network due to the idle network status. The combined mobile cluster network returns to step S104 to select one of the two header devices as the header device for the combined mobile cluster network, and the other one not selected becomes an agent device.

The Second Embodiment of the Present Invention

Figure 6:
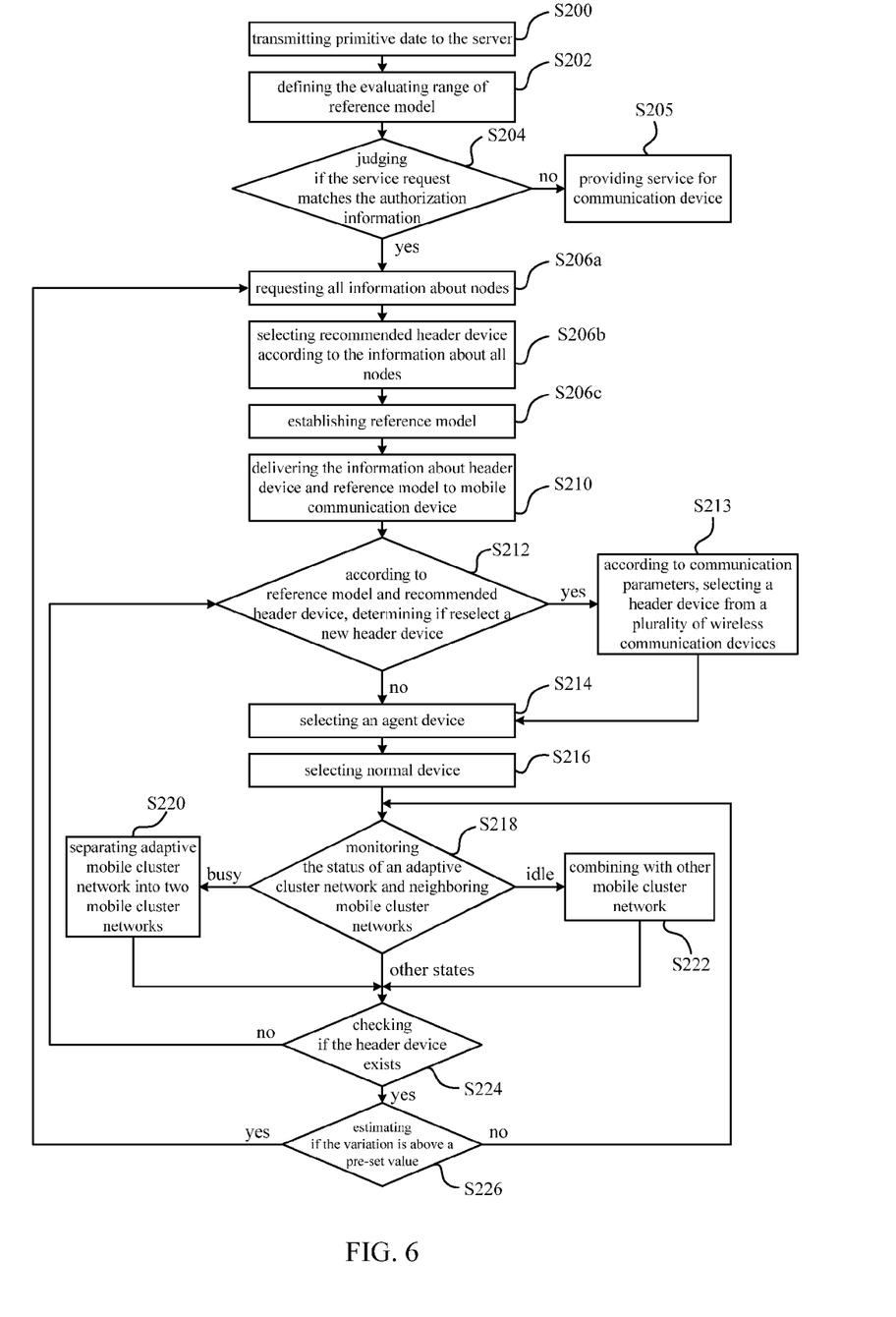
FIG. 6 illustrates a flow chart of the method for establishing the adaptive mobile cluster network according to another embodiment of the invention.
Figure 7:
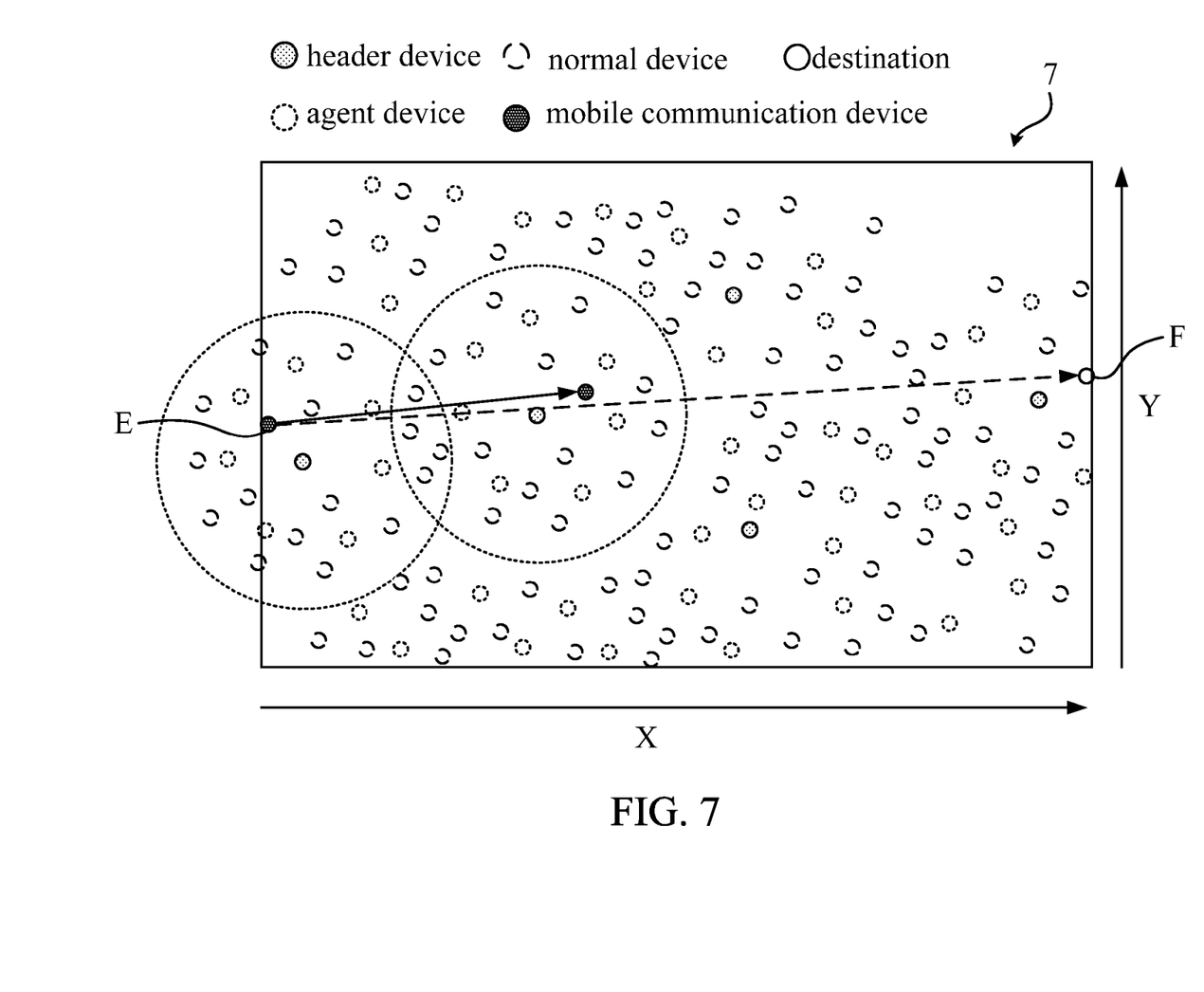
FIG. 7 illustrates a mobile cluster network established with the movement of the mobile communication device.

Please refer to FIG. 6 and FIG. 7. FIG. 6 shows the second embodiment of the invention, which illustrates a flow chart of a method for establishing an adaptive mobile cluster network. FIG. 7 illustrates a mobile cluster network established with movement of the mobile communication device, wherein x, y coordinates are respectively the horizontal and vertical addresses. In the second embodiment, the method for establishing an adaptive mobile cluster network comprises the following steps:

At first, step S200 is executed and the mobile communication device D delivers a predefined position or destination, a service request and authorization information to a server (not shown) which stores the information of a plurality of mobile communication devices in a database. Predefined position F could be selected through an electronic map by a user. A service request includes messages or files delivering and voice linking to other mobile communication devices. In addition, each mobile communication device has its own authorization information for using the service requests according to network using priority and packet transmitting priority, and the authorization information have to be passed to the server for being judged to get or reject authorized to use the service requests.

Step S202 is executed and the server defines an evaluating range of a reference model. As shown in FIG. 7, E and F represent the origin and predefined position respectively of the mobile communication device D.

The projection on the X-axis of the dotted line linked from the origin E to the predefined position F represents the length of the evaluating range (i.e. the distance between the mobile communication device D and predefined position F). The width of the evaluating range is multiple of the covered range of a wireless technology which the mobile communication device D uses. For example, if the wireless technology is WiFi which can cover about 100 meters, thus, the width of the evaluating range is multiple of 100 meters, such as 200 meters or 400 meters.

Step S204 is then executed. The server judges if the service request matches the authorization information. If the service request does not match the authorization information, step S205 is executed and the server stops providing service for the mobile communication device D. If the service request matches the authorization information, reference model 7 is established.

Establishing Reference Model 7 Comprises the Following Steps:

At first, step 206*a* is executed and the information about nodes (wireless communication devices) is requested; the server inspects whether the information (for example, position and communication parameters) of all nodes in the evaluating range are stored in the database. If not, the server requests the nodes to send the information back and then stores the information in the database.

Step 206*b* is then executed and the server, according to the database, evaluates the information of all nodes in the evaluating range to find the nodes with better operation capability and communication quality and set them as recommended header devices. Finally, step 206*c* is executed to establish the reference model. The server establishes the reference model 7 according to the position information, communication parameters and the recommended header devices. By this way, the server's loading can be reduced and rapidly establishes the reference model 7.

Step S210 is then executed. The server delivers information about the reference model 7 and the recommended header devices to the mobile communication device D.

Step S212 is then executed. The mobile communication device D determines whether to select one of the recommended header devices or reselect a new header device from the wireless communication devices except the recommended header devices as header device according to the variation between the information of the reference model 7 and that of the current evaluating range. If the mobile communication device D decides to reselect a new header device, step S213 is executed. According to communication parameters, the mobile communication device D selects a wireless communication device as the header device from a plurality of wireless communication devices.

After the header device is determined, step S214 is executed. The header device selects an agent device. The method for determining an agent device is the same as step S106. Then step S216 is executed. The agent device selects a plurality of normal devices, so as to establish an adaptive mobile cluster network. The method for establishing an adaptive mobile cluster network is the same as step S108.

Step S218 is then executed to monitor the network status and neighboring mobile cluster network. The method for monitoring is the same as step S110 of the first embodiment. If the monitoring result of step S218 is busy, step S220 is executed. The adaptive mobile cluster network is separated into two mobile cluster networks (the same as step S112). If the monitoring result of step S218 is idle and other mobile cluster networks exist, step S222 is executed. The header device, according to communication parameters and the status of other mobile cluster networks, determines that the adaptive mobile cluster network would be combined with which mobile cluster network (the same as step S114).

Step S224 is then executed to check if the header device exists. If the header device does not exist, returns to step S212. According to the reference model 7 and the recommended header devices, the mobile communication device D selects a new header device from the wireless communication devices. If the header device exists, step S226 is optionally executed to estimate the variation between the information of the reference model 7 and that of the current evaluating range, and whether the communication parameters satisfy the service request. If the variation is above a pre-set value, it means that the reference model 7 is not exact at the moment, returns to step S206a to establish another reference model. If the variation is not above the pre-set value, returns to step S218 to monitor the status of the adaptive mobile cluster network.

To sum up, the invention provides two methods to establish a mobile cluster network. One method for establishing the mobile cluster network is according to a requested network service (or service request) and monitors the network nodes; the other one is to set a reference model through a server according to positional and primitive data. Compared with prior art, the present invention has the advantages: (1) efficient network structure for transmitting data; (2) flexible for service requests; (3) better managing in a movable network; (4) more adaptive cells; and (5) better network loading.

Although the present invention has been illustrated and described with reference to the preferred embodiment thereof, it should be understood that it is in no way limited to the details of such embodiment but is capable of numerous modifications within the scope of the appended claims.

What is claimed is:

1. A method for establishing an adaptive mobile cluster network, comprising the following steps:
    (a) determining a network service requested by a mobile communication device;
    (b) according to the requested network service, determining at least one communication parameter needed by the mobile communication device;
    (c) according to the needed communication parameter, selecting a header device from a plurality of wireless communication devices by the mobile communication device;
    (d) selecting a plurality of agent devices from the remaining wireless communication devices by the header device; and
    (e) selecting a plurality of normal devices from the remained wireless communication devices by the agent devices, so as to establish the adaptive mobile cluster network.

2. The method of claim 1, wherein the at least one communication parameter comprises at least one selected from the group consisting of signal intensity, antenna pattern, computing ability, network type and network status.

3. The method of claim 1, wherein the header device has the best communication quality of the wireless communication devices.

4. The method of claim 1, wherein the ratio of the agent devices to the wireless communication devices is limited to a preset percentage.

5. The method of claim 1, wherein each of the wireless communication devices is selected from the group consisting of a mobile communication device, a base station and a wireless access points.

6. The method of claim 1, further comprising the steps:
    (f) monitoring the status of the adaptive mobile cluster network and other neighboring mobile cluster networks;
    (g) according to the status of step (f), selectively separating the adaptive mobile cluster network into two mobile cluster networks, or combining the adaptive mobile cluster network with the neighboring mobile cluster network; and
    (h) inspecting existence of the header device, and selectively adjusting the adaptive mobile cluster network according to step (c) to step (g).

7. The method of claim 6, wherein in step (f), monitoring the status of the adaptive mobile cluster network is through monitoring the status of packet delivering and receiving of the normal devices.

8. The method of claim 6, wherein in step (g), if the status of the adaptive mobile cluster network is busy, separates the adaptive mobile cluster network into two mobile cluster networks; if the status of the adaptive mobile cluster network is idle and the other mobile cluster networks exist, the header device determines one of the other mobile cluster network for combining with the adaptive mobile cluster network, according to the at least one communication parameter and the network statuses of the other mobile cluster networks.

9. The method of claim 6, wherein in step (h), if the header device exists, returns to step (f); if the header device does not exist, returns to step (c); if two header devices exist simultaneously, determining one of the header devices to be a new header device, and changing the other into an agent device according to step (c).

* * * * *